(12) United States Patent
Jutla

(10) Patent No.: US 8,121,285 B2
(45) Date of Patent: Feb. 21, 2012

(54) DATA PROCESSING FOR CODING

(75) Inventor: Charanjit S. Jutla, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 12/259,422

(22) Filed: Oct. 28, 2008

(65) Prior Publication Data

US 2010/0104096 A1 Apr. 29, 2010

(51) Int. Cl.
*H04K 1/00* (2006.01)
*G06F 11/30* (2006.01)

(52) U.S. Cl. .......... 380/29; 713/189; 713/190; 713/191; 713/192; 713/193

(58) Field of Classification Search ...... 380/29
See application file for complete search history.

(56) References Cited

U.S. PATENT DOCUMENTS

2004/0202318 A1* 10/2004 Lu .................................. 380/29

OTHER PUBLICATIONS

Schneier (Applied Cryptography—Second Edition—1996).*
"Grindahl—a family of hash functions", Lars R. Knudsen et al., Proceeding Fast Software Encription 2007, 17 pgs.

* cited by examiner

*Primary Examiner* — Longbit Chai
(74) *Attorney, Agent, or Firm* — Harrington & Smith (57) ABSTRACT

A system and method for data processing for coding. The method may include providing a first plurality of bytes of data, non-linearly transforming the first plurality of bytes into a second plurality of bytes, multiplying each of the second plurality of bytes of data by a predetermined constant of a plurality of constants to generate a third plurality of bytes, and organizing in use the third plurality of bytes as a plurality of output bytes. Systems to practice the foregoing methods are also described.

25 Claims, 12 Drawing Sheets

DATA PROCESSING FOR CODING

BACKGROUND

1. Field

The present invention relates to an efficient data processing and more specifically to generating an output data having a large minimum weight.

2. Description of Related Art

Typically, there are three main aspects of a cryptographic system. One aspect is to encrypt data using a secret key, another aspect is to digitally sign the data using a secret key, and the third aspect is to obtain a cryptographic fingerprint or a cryptographic hash. The cryptographic hash is used to digitally sign large files, by first obtaining a small fingerprint and then signing the small fingerprint using a secret key.

Methods to encrypt data using a secret key exist and are commonly called block ciphers, as these block ciphers encrypt data by dividing them into blocks of data, and processing a block at a time, with a feedback of some sort. The methods to sign data are called authentication schemes, or public key signature schemes, depending on whether a signature is required to have a property verifiable by a public party. The methods to obtain a fingerprint or cryptographic hash are called cryptographic hash functions, or just hash functions.

Typical cryptographic primitives use error-correcting codes to serve as linear mixers. Most error-correcting codes are linear mixers, and tend to have mixing properties desired in cryptographic primitives.

SUMMARY

Embodiments of the present disclosure provide a system and method for coding data in an efficient manner. The present disclosure teaches how to make a data coding system.

Briefly described, in architecture, one embodiment of the system, among others, can be implemented as follows.

The system may include a first processor configured to provide a plurality of tables having a plurality of elements, wherein each of the plurality of elements includes a first plurality of bits. A second processor may be coupled to the first processor, and the second processor may be configured to provide a first plurality of data having a second plurality of bits. A third processor may be coupled to the second processor, and the third processor may be configured to process the first plurality of data into a plurality of table indices. A data retriever may be coupled to the third processor, and the data retriever may be configured to retrieve the first plurality of data processed into the plurality of table indices. A data organizer may be coupled to the data retriever, and the data organizer may be configured to organize the first plurality of data into a second plurality of data. An output device may be coupled to the data organizer, and the output device may be configured to output in use the second plurality of data.

The present disclosure may also be viewed as providing a method for data processing. The method may include providing a first plurality of bytes of data, non-linearly transforming the first plurality of bytes into a second plurality of bytes, multiplying each of the second plurality of bytes of data by a predetermined constant of a plurality of constants to generate a third plurality of bytes, and organizing in use the third plurality of bytes as a plurality of output bytes.

Other systems, methods, features, and advantages of the present disclosure will be, or will become apparent, to a person having ordinary skill in the art upon examination of the following drawings and detailed description. It is intended that all such additional systems, methods, features, and advantages included within this description, be within the scope of the present disclosure, and be protected by the accompanying claims.

BRIEF DESCRIPTION OF THE SEVERAL VIEWS OF THE DRAWINGS

Many aspects of the disclosure can be better understood with reference to the following drawings. Components in the drawings are not necessarily to scale, emphasis instead being placed upon clearly illustrating principles of the present invention.

DETAILED DESCRIPTION

The present disclosure relates to a system and method for data processing for generating an output data having a large minimum weight.

A data mixer has preferable mixing properties if for a large proportion of zero bytes in output bytes, except for a case of all of the output bytes being zero, an input has a large proportion of non-zero input bytes. An embodiment of the present disclosure has preferable mixing properties over 16 bytes, while having an efficient implementation as described below.

Figure 1:
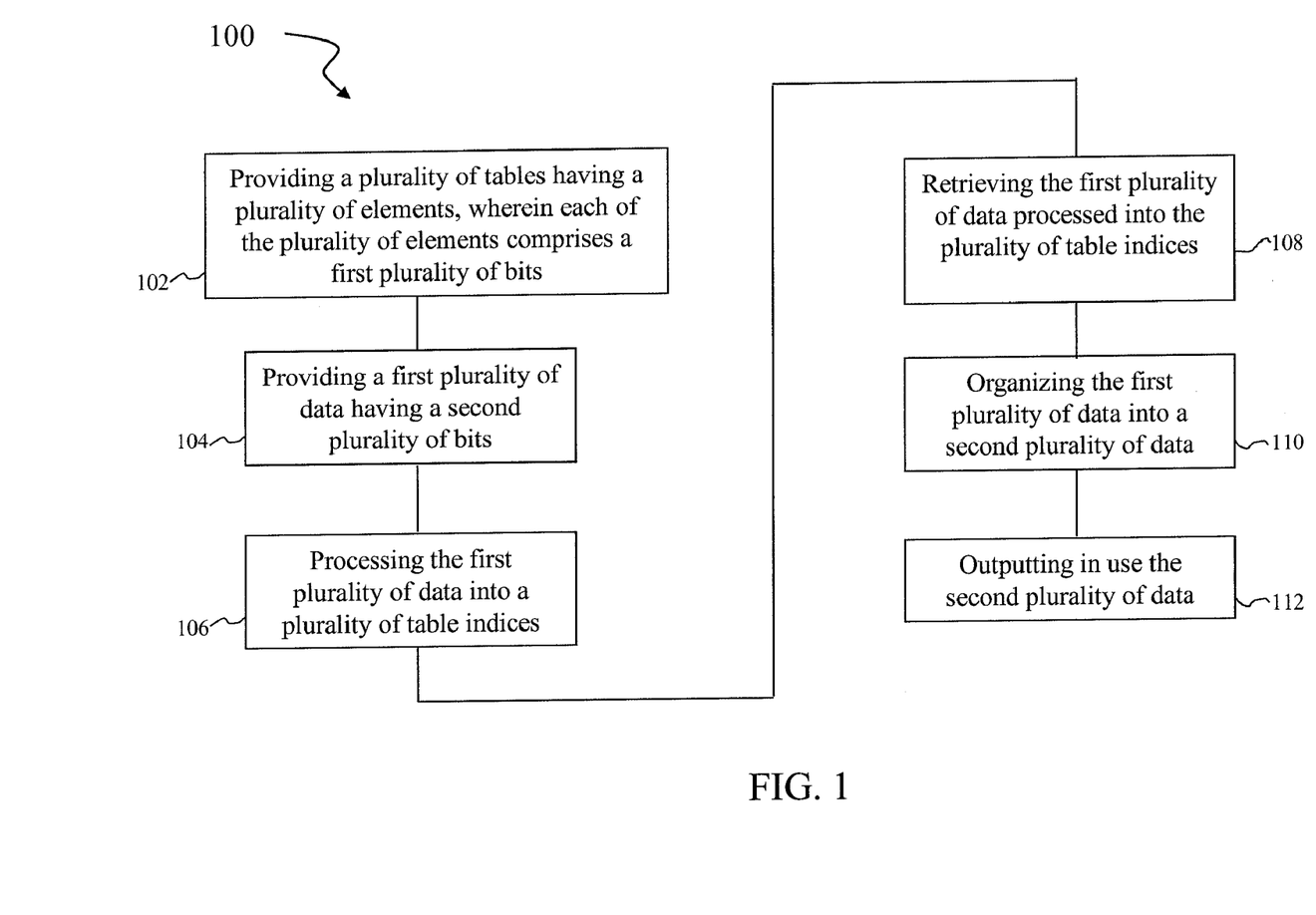
FIG. 1 is an embodiment of a method of the present disclosure.

FIG. 1 is a flowchart of an embodiment of a method 100 of the present disclosure. The method 100 may include providing a plurality of tables having a plurality of elements, wherein each of the plurality of elements comprises a first plurality of bits (block 102), providing a first plurality of data having a second plurality of bits (block 104), and processing the first plurality of data into a plurality of table indices (block 106). The second plurality of bits may be an input byte. The method 100 may also include retrieving the first plurality of data that has been processed into the plurality of table indices (block 108), organizing the first plurality of data into a second plurality of data (block 110), and outputting in use the second plurality of data (block 112).

Figure 2:
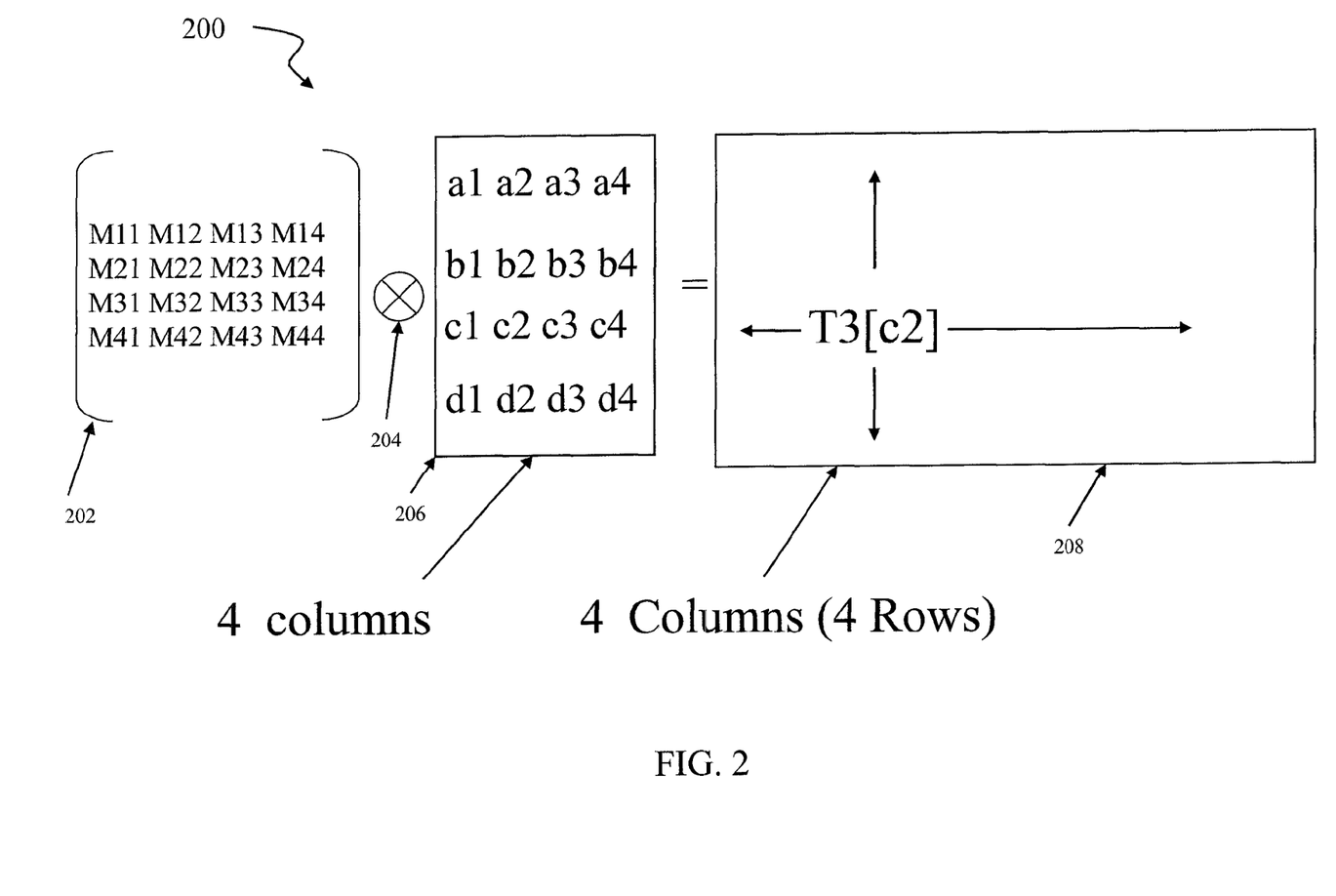
FIG. 2 illustrates a portion of the method of FIG. 1.

FIG. 2 illustrates a portion of the method 100 of FIG. 1. A matrix 202 is multiplied with four columns of input bytes 206 a1 through d4. A symbol 204 indicates a multiplication over a Galois field (GF). An output column 208 of 4 columns is generated. The plurality of tables in the block 102 of the method 100 may be a minimum distance separable matrix.

The arrows shown in the output column 208 indicate operation in a row and a column as described below.

M11, M12, ..., M43, and M44 may be 8-bit constants, possibly positive or negative. The output column 208 shows "T3[c2]" as an entry. A table T3 may be a table indicating a multiplication of a third column of the matrix 202 by a byte c2 of input bytes 206 wherein the multiplication may be stored in the table T3, wherein the entries in the table T3 may be indexed by the byte c2. Accordingly, in the method 100, the retrieving the first plurality of data, such as input bytes 206, processed into the plurality of table indices (block 108) may include associating the plurality of table indices, such as the byte c2, with the plurality of elements, such as M11, M12, ..., M43, and M44. In an exemplary method, M11, M12, ..., M43, and M44 may be bytes which may possibly be viewed as elements of a finite field $GF(2^8)$, i.e., the finite field having 256 elements. Similarly, entries in input bytes 206, and the output column 208 may be bytes, possibly viewed as elements in the same finite field. A matrix multiplication may be considered over the finite field. It is known in the art that an addition of two elements in the finite field is same as performing a bit-wise exclusive-OR (XOR) of the two elements, each element possibly being a byte or an 8-bit value.

In one embodiment, the constants M11, M21, M31 and M41 may be set to 00000001, 00000001, 00000010, and 00000111 respectively. As a person having ordinary skill in the art would appreciate, in a field $GF(2^8)$, elements of the fields which are 8-bit quantities may also be viewed as degree 7 binary polynomials. Thus, 00000111 is the polynomial $x^2+x+1$, and 00000010 is the polynomial x, and 00000001 is 1. Further, the field $GF(2^8)$ may be defined by an underlying irreducible polynomial, which in the present embodiment may be $x^8+x^4+x^3+x+1$.

In another embodiment, the constants M11, M21, M31 and M41 may be set to 00000001, 00000001, 00000111, and 00000100 respectively, or in terms of $GF(2^8)$, the constants may be set to the polynomials 1, 1, $x^2+x+1$, and $x^2$ respectively.

In the method 100, the plurality of elements, such as in the block 102 of FIG. 1, may be a plurality of predetermined constants M11, M21, M31 and M41. Each of the plurality of predetermined constants M11, M21, M31 and M41 may be multiplied by a predetermined byte generated from the second plurality of bits, such as the bits of the input bytes 206.

In the method 100, the retrieving the first plurality of data, such as input bytes 206, processed into the plurality of table indices (block 108) may include loading the first plurality of data into at least one data storage unit. Such storage unit may be a temporary storage unit, such as a computer memory.

In the method 100, the organizing the first plurality of data, such as the input bytes 206, into the second plurality of data (block 110), such as the output column 208, may include performing at least one logic operation on at least one of the first plurality of data, such as the input bytes 206 and the second plurality of data, such as the output column 208. The performing the at least one logic operation may include performing at least one of an AND operation and an exclusive-OR operation. Further, the performing the at least one logic operation may include exclusive-ORing a byte of the at least one of the first plurality of data, such as the input bytes 206, into a column having the byte c2 (vertical arrows shown in the output column 208) and transposing the column and exclusive-ORing the column into a row having the byte c2 (vertical arrows shown in the output column 208).

In the method 100, the providing the first plurality of data, such as the input bytes 206, having a second plurality of bits may include arranging the first plurality of data into a p by q matrix where p and q are positive numbers. The arranging the first plurality of data into a p by q matrix may include identifying the first plurality of data by a byte including a first number and a second number, the first number being associated with one of a row number and a column number and the second number being associated with one of a row number and a column number. The first number and the second number may be subscripts as known in matrix algebra. The row number and the column number may be of a matrix. Further, the identifying the first plurality of data by a byte including a first number and a second number may include associating the row number to a row of a location of the byte, possibly in a matrix, and associating the column number to a column of the location of the byte, possibly in a matrix.

In the method 100, the processing the first plurality of data, such as the input bytes 206, into the plurality of table indices, such as the byte c2 shown in the output column 208 of FIG. 2, may include setting the first plurality of data as one of the plurality of table indices.

In the method 100, the providing the plurality of tables may include providing at least one of a matrix, a circulant matrix, and a minimum distance separable matrix. Circulant matrices have a property that each column is a rotation of entries of other columns. For example, a second column is a rotation of the first column by one byte. Thus, the entire matrix may be specified by specifying the first column and rotating the first column appropriately to generate the other columns.

Figure 3:
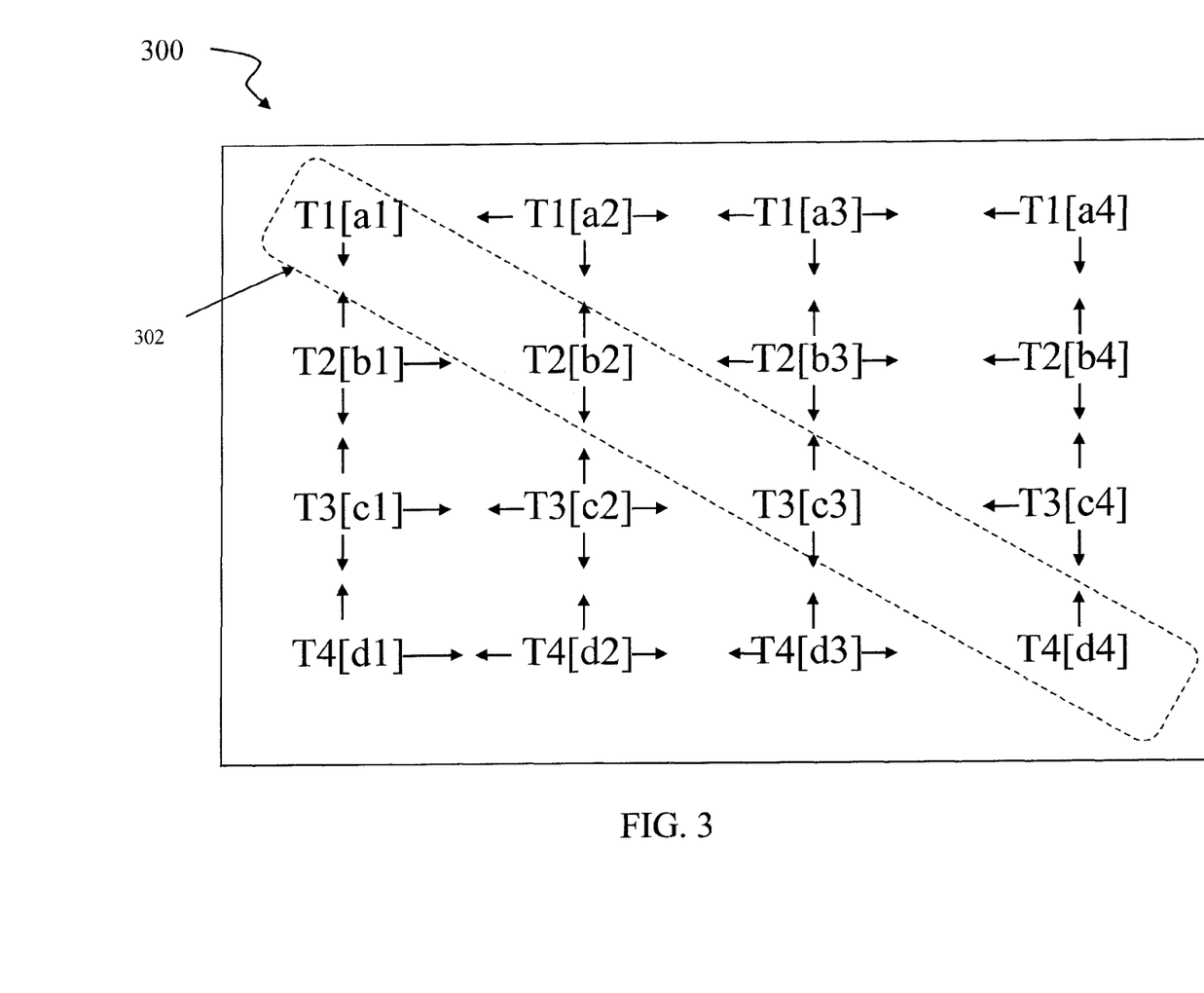
FIG. 3 illustrates an embodiment of a portion of the method of FIG. 2.

FIG. 3 illustrates an embodiment of a portion of the method 100 of FIG. 2. In the method 100, the transposing the column and exclusive-ORing the column into the row having the byte c2 may include omitting transposing the column having the byte c2 and omitting exclusive-ORing the column for a byte located on a diagonal 302 as shown in FIG. 3. Vertical arrows indicate an exclusive-OR operation and horizontal arrows indicate a transposing and an exclusive-OR operation.

Figure 4:
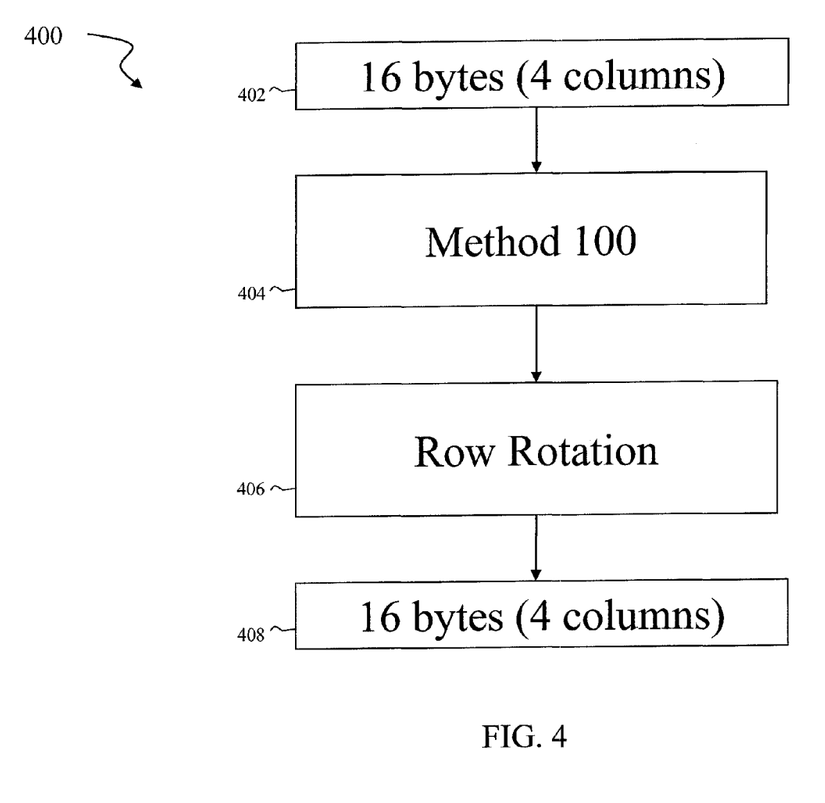
FIG. 4 illustrates an embodiment of a method of the present disclosure.

FIG. 4 illustrates an embodiment of a method 400 of the present disclosure. The method 400 may include providing 16 bytes, possibly arranged in 4 columns (block 402), applying the method 100 as described above (block 404), performing a row rotation (block 406), and outputting 16 bytes, possibly arranged in 4 columns (block 408). In the method 400, the outputting in use the second plurality of data from the method 100 may include outputting a permutation of the second plurality of data, such as the output column 208 as described above. In the method 400, the outputting the permutation of the second plurality of data may include generating a row rotation (block 406) of the second plurality of data, such as the output column 208.

Figure 5:
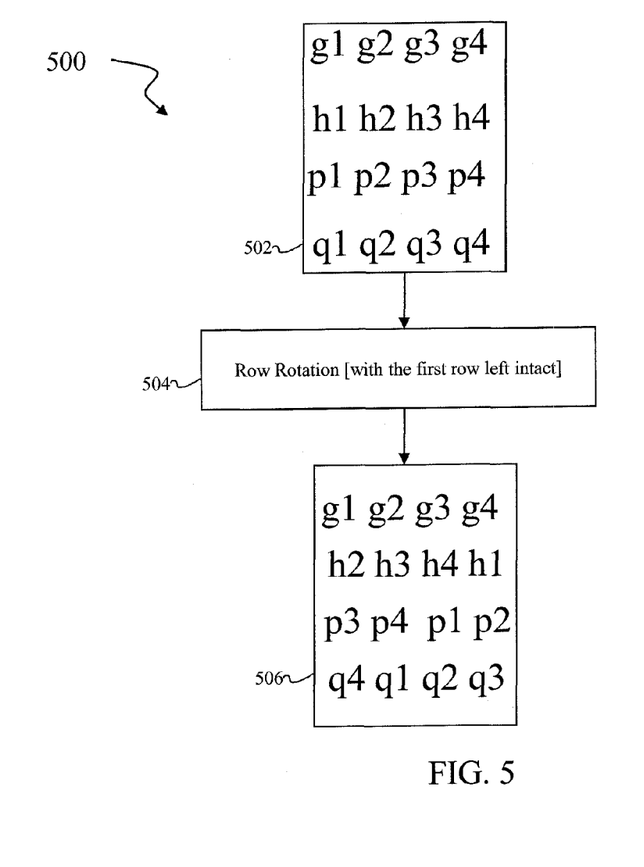
FIG. 5 illustrates another embodiment of a method of the present disclosure.

FIG. 5 illustrates another embodiment, being a method 500, of the method 400 of the present disclosure. In the method 500, an exemplary array of bytes may undergo a row rotation where a row may be left intact. Accordingly, in the method 500, the generating the row rotation of the second plurality of data, such as the output column 208, may encompass excluding generating the row rotation of a row of the second plurality of data, such as the output column 208. The exemplary array of bytes g1, g2, ..., q3, and q4 (block 502) may be row rotated with a first row left intact (block 504), and an output column may be g1, g2, ..., q2, and q3 (block 506). A first row left intact is merely an illustration that other row(s) may instead be left intact.

Figure 6:
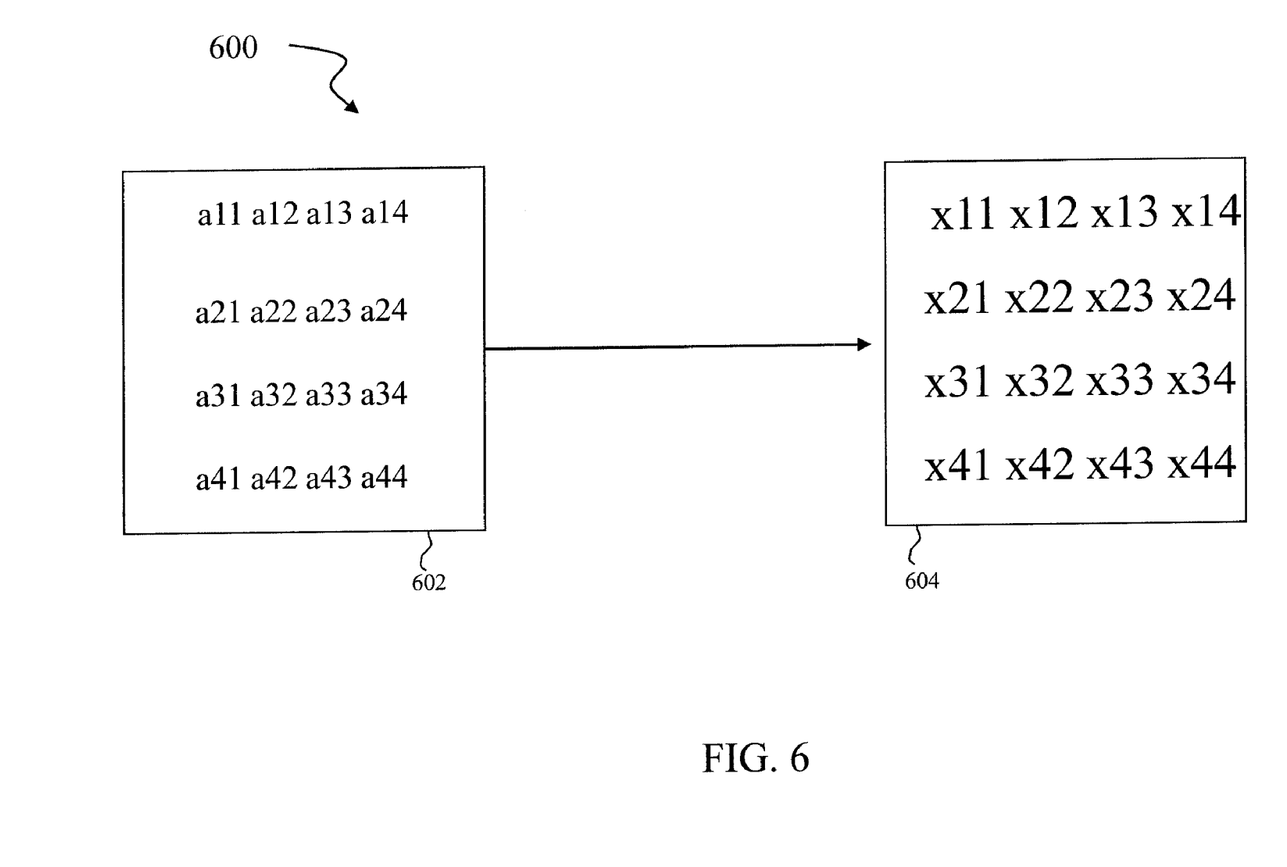
FIG. 6 illustrates a portion of an embodiment of a method of the present disclosure.

FIG. 6 illustrates a portion, being a method 600, of an embodiment of a method of the present disclosure. In the method 600, an embodiment of a method of the present disclosure transforms input bytes (a11, ..., a44 at block 602) into output bytes (x11, ..., x44 at block 604).

Figure 7:
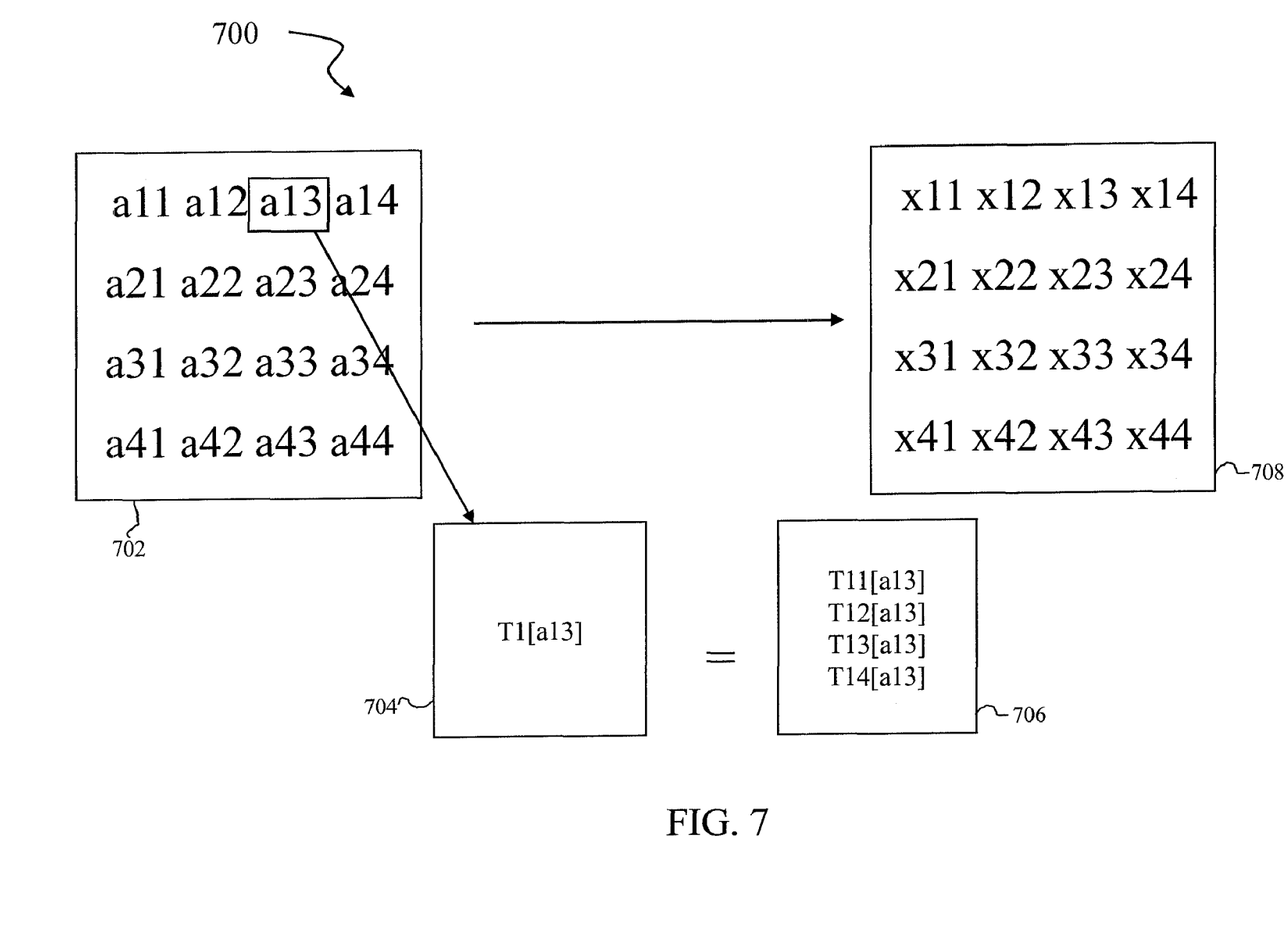
FIG. 7 illustrates a portion of FIG. 6.

FIG. 7 illustrates a portion of FIG. 6. In a method 700, input bytes, such as the input bytes 206 described above, may be arranged in a four by four matrix, with the first column of input bytes being a11, a21, a31 and a41, the second column being a12, a22, a32 and a42 and so on (block 702). Since a table may have entries which may be four bytes long, individual bytes in an intermediate output may be referenced by an additional subscript. Thus, the second byte in the intermediate table lookup T1[a13] (block 704) may be called T12[a13], and the third byte in the same intermediate table lookup may be called T13[a13] and so on as in FIG. 7 (block 706).

Figure 8:
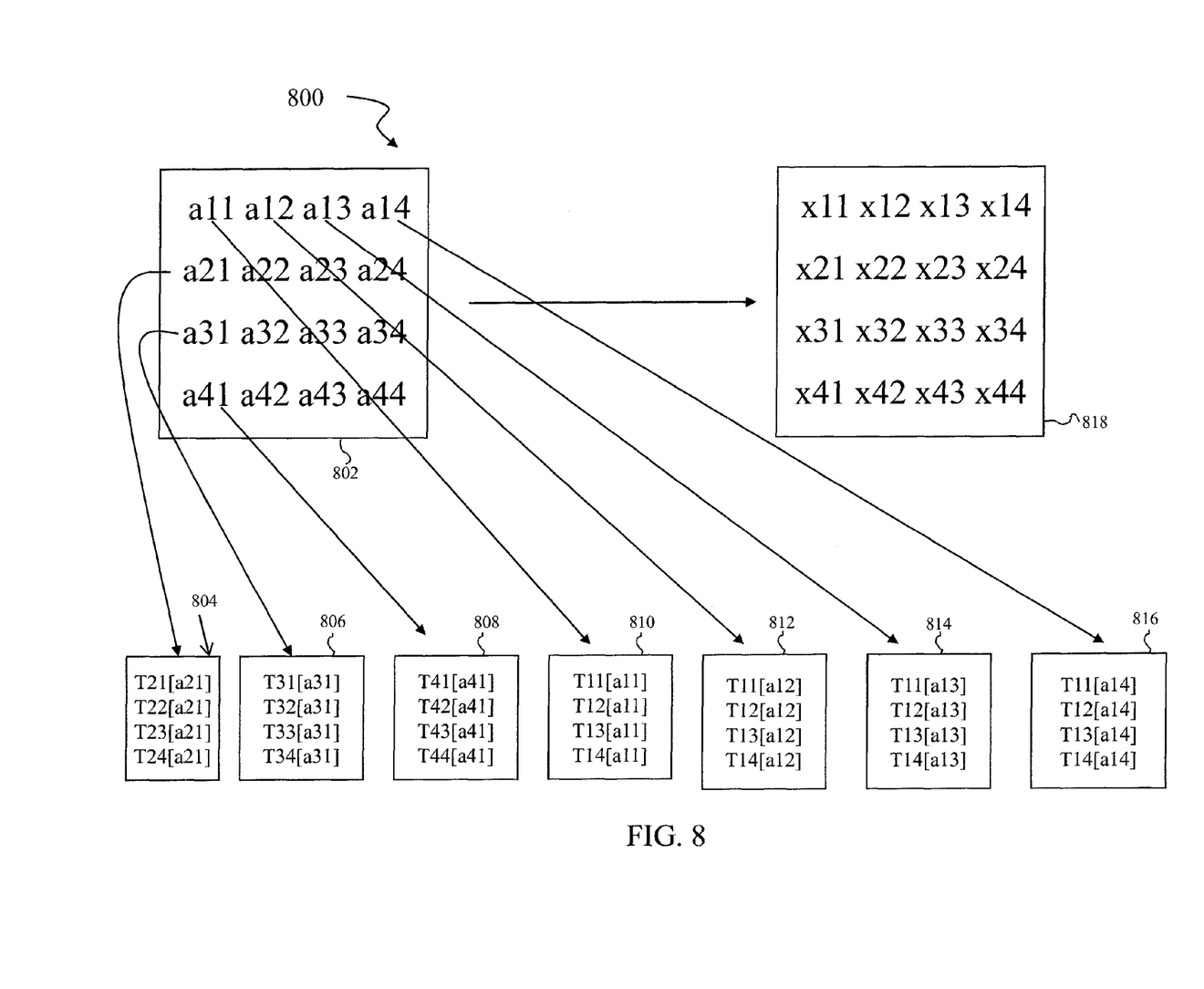
FIG. 8 illustrates operations on a byte according to an embodiment of a method of the present disclosure.

FIG. 8 illustrates operations on a byte according to an embodiment of a method of the present disclosure. FIG. 8 shows a method 800 where taking a first column and a first row of a matrix (block 802), such as the input bytes 206 described above, various tables and table indices are generated (blocks 804, 806, 808, 810, 812, 814, and 816) for the bytes in question of block 802. An output is shown in block 818, such as the output column 208 discussed above.

Figure 9:
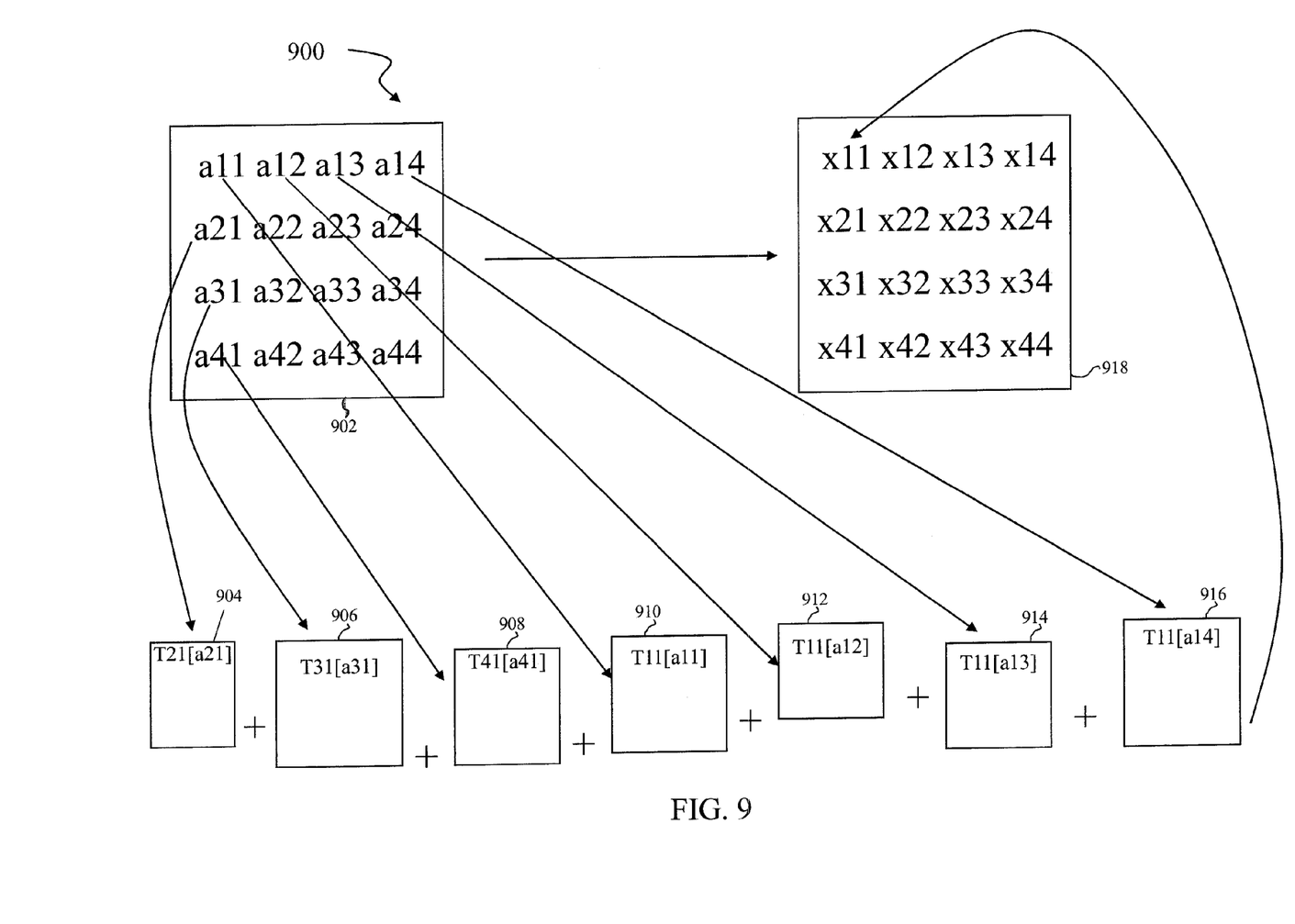
FIG. 9 illustrates additional operations on the byte of FIG. 8.

FIG. 9 illustrates additional operations on the bytes of FIG. 8. In a method 900, bytes of a first column and a first row of a matrix (block 902), such as the input bytes 206 described above, are shown. A byte x11 is shown to be generated (block 918) by an addition of bytes at predetermined table indices shown in blocks 904, 906, 908, 910, 912, 914, and 916.

Figure 10:
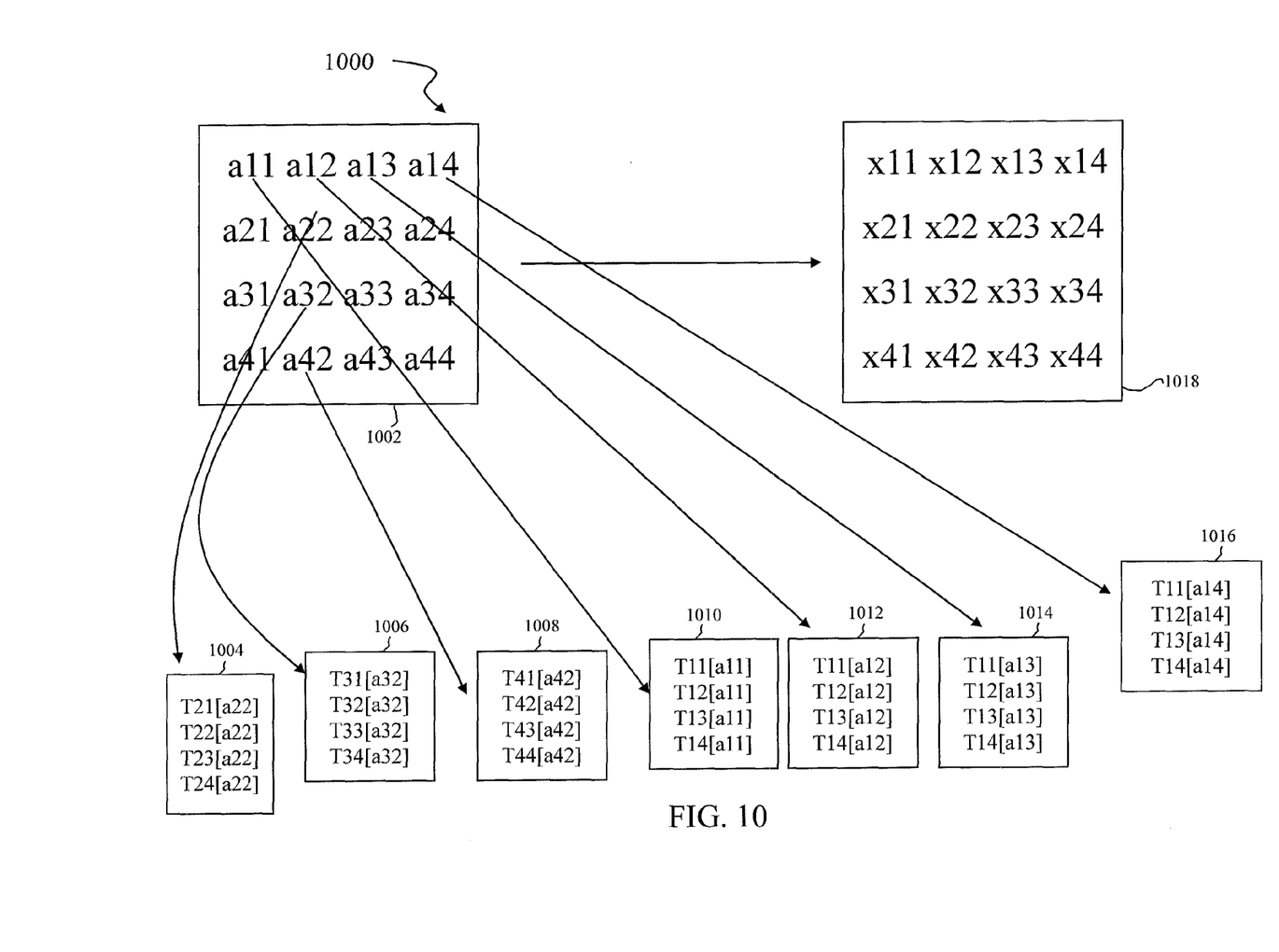
FIG. 10 illustrates operations on a byte according to an embodiment of a method of the present disclosure.
Figure 11:
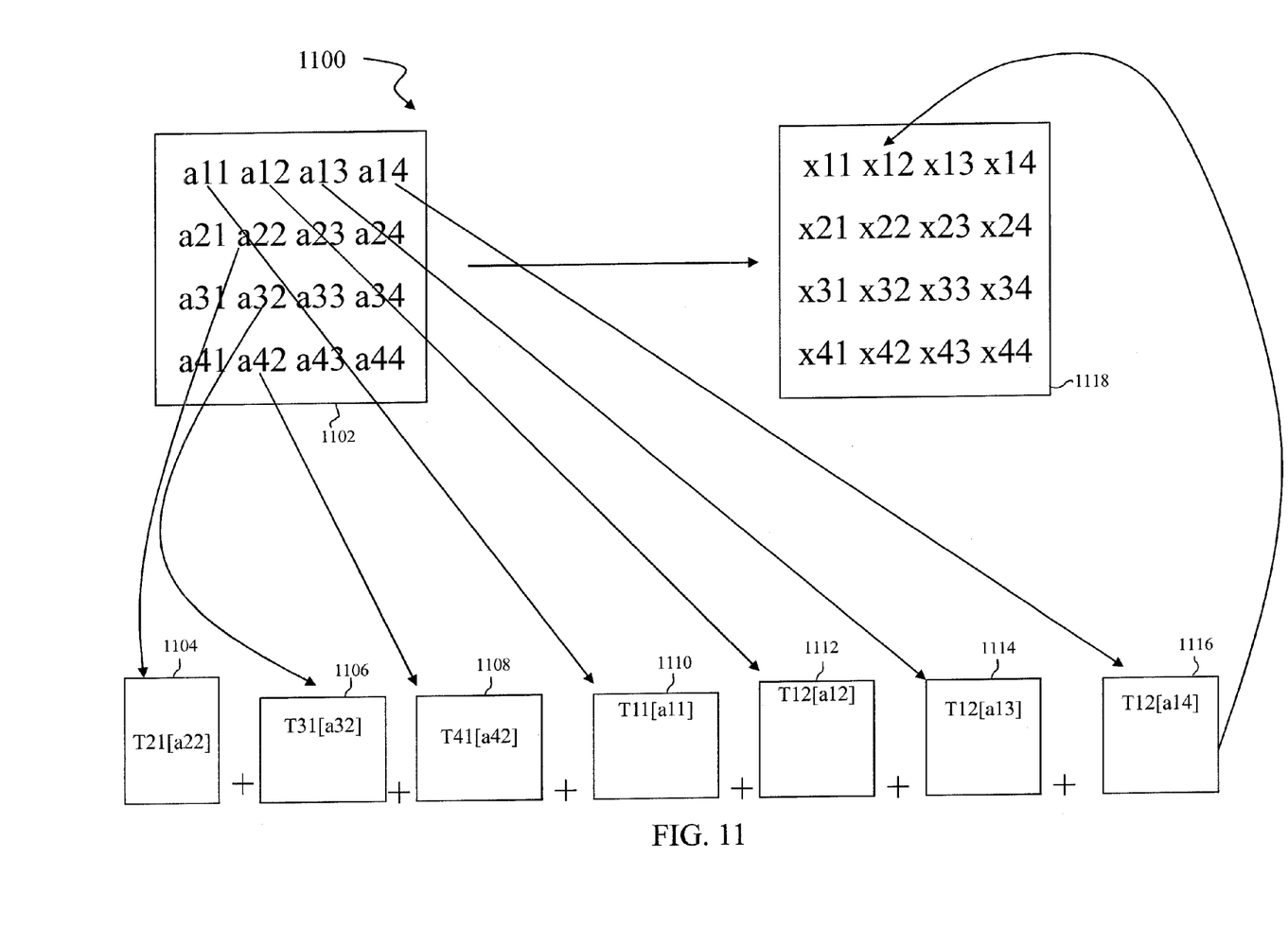
FIG. 11 illustrates additional operations on the byte of FIG. 10.

FIG. 10 illustrates operations on a byte according to an embodiment, being a method 1000, of a method of the present disclosure. FIG. 11 illustrates additional operations, in a method 1100, on the byte of FIG. 10. FIGS. 10 and 11 accomplish operations to generate a byte x12. In FIG. 10, input bytes at block 1002 are transformed to output bytes at block 1018 wherein tables and table indices are generated at blocks 1004, 1006, 1008, 1010, 1012, 1014, and 1016. In FIG. 11, in a method 1100, bytes of a second column and a first row of a matrix (block 1102), such as the input bytes 206 described above, are shown. A byte x12 is shown to be generated (block 1118) by an addition of bytes in tables at predetermined table indices shown in blocks 1104, 1106, 1108, 1110, 1112, 1114, and 1116. The operations of FIGS. 8-11 are discussed in more detail below.

The output bytes, such as the output column 208 described above, may be arranged in a four by four matrix as well, and individual bytes in the output matrix may be named x-ij, for the byte in the i-th row and the j-th column. Then in one embodiment of the present invention, x-1j may be given by T11[a1j] plus T21[a2j] plus T31[a3j] plus T41[a4j] plus T1j[a12] plus T1j[a13] plus T1j[a14], for values 1, 2, 3, and 4 for j. This is illustrated in FIGS. 8 and 9 for x11, and in FIGS. 10 and 11 for x12. An addition in the field GF(2^8) is a bit-wise exclusive-OR. It may be noted that the term T1j[a11] is missing from the above expression. Possible reasons may be an exclusive-OR operation between two identical values at a corner of a matrix, or omitting from transposing a byte on a diagonal. Similarly, x2j is given by T12[a1j] plus T22[a2j] plus T32[a3j] plus T42[a4j] plus T2j[a21] plus T2j[a23] plus T2j[a24], for values 1, 2, 3, and 4 for j.

Further, x3j may be given by T13[a1j] plus T23[a2j] plus T33[a3j] plus T43[a4j] plus T3j[a31] plus T3j[a32] plus T3j[a34], for values 1, 2, 3, and 4 for j. And x4j may be given by T14[a1j] plus T24[a2j] plus T34[a3j] plus T44[a4j] plus T4j[a41] plus T4j[a42] plus T4j[a43], for values 1, 2, 3, and 4 for j.

In another embodiment of the present invention, the bytes in a transpose of a column may be first reversed before exclusive-ORing into the output rows. Thus, for j taking values 1, 2, 3, and 4, as described earlier, j may be set to values 4, 3, 2, and 1 in that order. Consequently, x-1j may be given by T11[a1j] plus T21[a2j] plus T31[a3j] plus T41[a4j] plus T1s[a12] plus T1s[a13] plus T1s[a14].

Another embodiment of a method of the present disclosure may include, providing a first plurality of bytes of data, such as the input bytes 206 described above, non-linearly transforming the first plurality of bytes into a second plurality of bytes, multiplying each of the second plurality of bytes of data by a predetermined constant of a plurality of constants to generate a third plurality of bytes, and organizing in use the third plurality of bytes as a plurality of output bytes. In the aforementioned method, the non-linearly transforming the first plurality of bytes may be an operation to obtain a reciprocal, a square, a cube or similar. The predetermined constant of a plurality of constants may be M11, M21, M31, and M41 as described above. The organizing in use the third plurality of bytes may include ANDing, exclusive-ORing, and transposing an element on a row or a column of a matrix.

In the aforementioned method, the multiplying each of the second plurality of bytes may be performed in a finite field. The finite field may have at least one of a characteristic two and a size 256.

In another embodiment, a non-linear transformation may be first applied to the input bytes 206 individually, before the 16 bytes are mixed. Thus, a pre-computed table may already incorporate a non-linear transformation into the pre-computed table.

Figure 12:
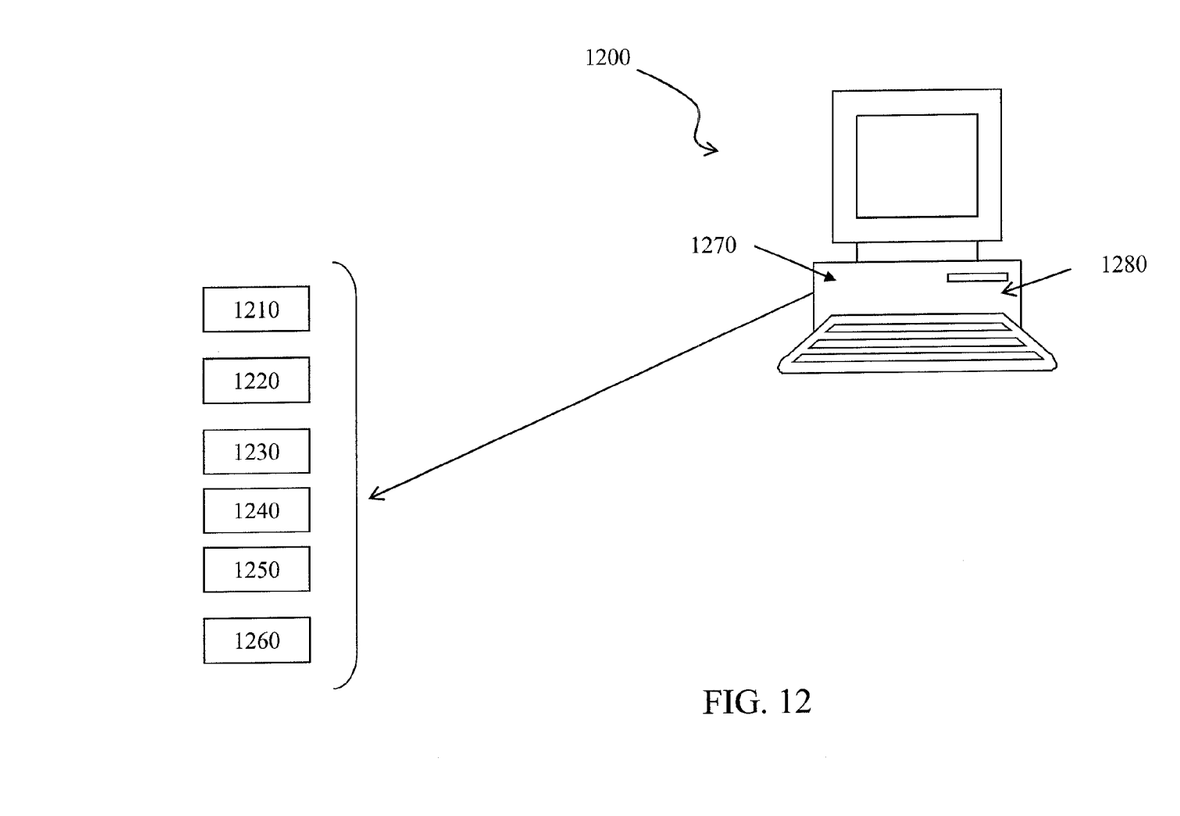
FIG. 12 illustrates an embodiment of a system of the present disclosure.

FIG. 12 illustrates an embodiment of a system of the present disclosure. A system 1200 may include a first processor 1210 configured to provide a plurality of tables, such as the matrix 202 of FIG. 2, having a plurality of elements M11 . . . M44, wherein each of the plurality of elements M11 . . . M44 may include a first plurality of bits, a second processor 1220 coupled to the first processor 1210, the second processor 1220 being configured to provide a first plurality of data having a second plurality of bits, such as the input bytes 206, and a third processor 1230 coupled to the second processor 1220, the third processor 1230 being configured to process the first plurality of data, such as the input bytes 206, into a plurality of table indices, such as byte c2 shown in the output column 208 of FIG. 2.

The system 1200 may include a data retriever 1240 coupled to the third processor 1230, the data retriever 1240 being configured to retrieve the first plurality of data, such as the input bytes 206, processed into the plurality of table indices, a data organizer 1250 coupled to the data retriever 1240, the data organizer 1250 being configured to organize the first plurality of data, such as the input bytes 206, into a second plurality of data, such as the output column 208, and an output device 1260 coupled to the data organizer 1250, the output device 1260 being configured to output in use the second plurality of data.

In the system 1200, the data organizer 1250 may be configured to perform at least one operation selected from the group consisting of: exclusive-OR a byte of the at least one of the first plurality of data into a column having the byte, transpose the column, and exclusive-OR the column into a row having the byte.

As a person skilled in the art would appreciate, the system 1200 may include a computer 1270 having the computer program product 1280. As shown, the computer 1270 also includes the first processor 1210, the second processor 1220, the third processor 1230, the data retriever 1240, the data organizer 1250, and the output device 1260 coupled to respective components as described above in a manner known in the art, such as electromagnetically, time-multiplexed, and space-multiplexed.

The foregoing method 100 or elements of the method 100 could also be stored on a computer-readable storage medium having computer-executable instructions to implement the method 100 or the elements of the method 100. A computer program product 1280, shown in FIG. 12, may have computer-executable instructions for: providing a plurality of tables having a plurality of elements, wherein each of the plurality of elements comprises a first plurality of bits, such as in the block 102 of the method 100, providing a first plurality of data having a second plurality of bits, such as in the block 104 of the method 100, processing the first plurality of data into a plurality of table indices, such as in the block 106 of the method 100, retrieving the first plurality of data processed into the plurality of table indices, such as in the block 108 of the method 100), and organizing the first plurality of data into a second plurality of data, such as in the block 110 of the method 100, and outputting in use the second plurality of data, such as in the block 112 of the method 100.

In the computer program product 1280, the organizing the first plurality of data may include performing at least one operation selected from the group consisting of: exclusive-OR a byte of the at least one of the first plurality of data into a column having the byte, transpose the column, and exclusive-OR the column into a row having the byte. In the computer program product 1280, the outputting in use the second plurality of data may include generating a row rotation of the second plurality of data.

As a person having an ordinary skill in the art would appreciate, an arrow entering a block or a symbol indicates an input and an arrow leaving a block or a symbol indicates an output. Similarly, connections described below may be of any electromagnetic type, such as electrical, optical, radio-frequency, and magnetic.

The terminology used herein is for the purpose or describing particular embodiments only and is not intended to be limiting or the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. An embodiment was chosen and described in order to best explain the principles of the invention and the practical application, and to enable others of ordinary skill in the art to understand the invention for various embodiments with various modifications as are suited to the particular use contemplated.

As a person having ordinary skill in the art would appreciate, the elements or blocks of the methods described above could take place at the same time or in an order different from the described order.

It should be emphasized that the above-described embodiments are merely some possible examples of implementation, set forth for a clear understanding of the principles of the disclosure. Many variations and modifications may be made to the above-described embodiments of the invention without departing substantially from the principles of the invention. All such modifications and variations are intended to be included herein within the scope of this disclosure and the present invention and protected by the following claims.

What is claimed is:

1. A method comprising:
   configuring at least one processor to perform the functions of:
      providing a plurality of tables having a plurality of table data elements, wherein each of the table data elements comprises a column of bytes;
      initializing an output matrix;
      for each of a plurality of input bytes:
         retrieving a table data element from one of the tables using the input byte as an index to the table; and
         processing the retrieved table data element into said output matrix, wherein processing the table data element comprises exclusive-ORing one or more bytes of the retrieved table data element into one or more columns of said output matrix, transposing the column of bytes comprising the table data element, and exclusive-ORing one or more bytes of the transposed column of bytes into one or more rows of said output matrix.

2. The method of claim 1, further comprising organizing the input bytes into an input matrix of bytes, and wherein retrieving the table data element comprises determining a table from which the table data element is retrieved using an index of the input byte in the input matrix.

3. The method of claim 2, wherein processing the retrieved table data element into the output matrix further comprises omitting transposing the retrieved table data element and omitting exclusive-ORing the bytes of the retrieved table data element if the table data element corresponds to an input byte located on a diagonal of the input matrix.

4. The method of claim 2, wherein processing the retrieved table data element into the output matrix comprises performing a rotation on the bytes of the retrieved table data element.

5. The method of claim 4, wherein the bytes in a transpose of the column are first reversed before exclusive-ORing into one or more of the output rows.

6. The method of claim 2, wherein the retrieved table data element is exclusive-ORed into at most one column of the output matrix and the transposition of the table data element is exclusive-ORed into at most one row of the output matrix.

7. The method of claim 6, wherein a column index of the at most one column of the output matrix is the same as a column index of the input byte in the input matrix.

8. The method of claim 6, wherein a row index of the at most one column of the output matrix is the same as a row index of the input byte in the input matrix.

9. The method of claim 8, wherein the bytes comprising one or more of the table data elements are generated from a predetermined byte by multiplication in a field.

10. The method of claim 1, further comprising performing a permutation on said output matrix.

11. The method of claim 10, further comprising generating a row rotation of said output matrix.

12. The method of claim 11, wherein the generating the row rotation of said output matrix comprises excluding generating the row rotation of at least one row of said output matrix.

13. The method of claim 1, wherein the output matrix is initialized by setting all bytes in the matrix to zero.

14. The method of claim 1, wherein the output matrix is initialized by setting at least one of a plurality of columns of the matrix columns of the output matrix to a data element retrieved from one of the tables using an input byte as an index to the table.

15. An apparatus comprising:
a processor configured to:
provide a plurality of tables having a plurality of table data elements, wherein each of the table data elements comprises a column of bytes;
initialize an output matrix;
for each of a plurality of input bytes:
retrieve a table data element from one of the tables using the input byte as an index to the table; and
process the retrieved table data element into the output matrix, wherein processing the table data element comprises exclusive-ORing one or more bytes of the table data element into one or more columns of the output matrix, transposing the column of bytes comprising the table data element, and exclusive-ORing one or more bytes of the transposed column of bytes into one or more rows of the output matrix.

16. The apparatus of claim 15, wherein the processor is further configured to organize the input bytes into an input matrix of bytes, and wherein retrieving the table data element comprises determining a table from which the table data element is retrieved using an index of the input byte in the input matrix.

17. The apparatus of claim 16, wherein processing the retrieved table data element into the output matrix further comprises omitting transposing the retrieved table data element and omitting exclusive-ORing the bytes of the retrieved table data element if the retrieved table data element corresponds to an input byte located on a diagonal of the input matrix.

18. A computer readable memory storing a program of instructions, execution of which by a processor configures an apparatus to perform the functions of:
providing a plurality of tables having a plurality of table data elements, wherein each of the table data elements comprises a column of bytes
initializing an output matrix;
for each of a plurality of input bytes:
retrieving a table data element from one of the tables using the input byte as an index to the table; and
processing the retrieved table data element into the output matrix, wherein processing the table data element comprises exclusive-ORing one or more bytes of the table data element into one or more columns of the output matrix, transposing the column of bytes comprising the table data element, and exclusive-ORing one or more bytes of the transposed column of bytes into one or more rows of the output matrix.

19. The computer readable memory of claim 18, wherein the execution of the program of instructions further configures the apparatus to organize the input bytes into an input matrix of bytes, and wherein retrieving the table data element comprises determining a table from which the table data element is retrieved using an index of the input byte in the input matrix.

20. The computer readable memory of claim 19, wherein processing the retrieved table data element into the output matrix further comprises omitting transposing the retrieved table data element and omitting exclusive-ORing the bytes of the retrieved table data element if the retrieved table data element corresponds to an input byte located on a diagonal of the input matrix.

21. A method comprising:
configuring at least one processor to perform the functions of:
providing a plurality of tables having a plurality of table data elements, wherein each of the table data elements comprises a column of bytes;
using each of a plurality of input bytes as an index to one of the tables to retrieve a table data element;
initializing an output matrix;
exclusive-ORing one or more of the retrieved table data elements to one or more columns of the output matrix;
transposing one or more of the retrieved table elements;
exclusive-ORing the transposed table data element to one or more rows of the output matrix; and
wherein the input bytes are organized into an input matrix of bytes, such that the table from which a table data element is to be obtained is determined by an index of the input byte in the input matrix, and wherein the column or the row into which the retrieved data element is to be exclusive-ORed is also determined by the index of the of the input byte in the input matrix.

22. The method of claim 21, further comprising omitting transposing and exclusive-ORing table data elements corresponding to input bytes lying on a diagonal of the input matrix.

23. The method of claim 21, wherein at least one of the plurality of table data elements is exclusive-ORed into a column of the output matrix but is not transposed and exclusive-ORed into a row of the output matrix.

24. The method of claim 23, wherein a table data element corresponding to an input byte lying on a diagonal of the input matrix is not exclusive-ORed into a column of the output matrix.

25. The method of claim 21, wherein at least one of the plurality of table data elements is transposed and exclusive-ORed into a row of the output matrix but is not exclusive-ORed into a column of the output matrix.

* * * * *